United States Patent

[11] 3,587,298

[72] Inventor John E. Jacobs
 Evanston, Ill.
[21] Appl. No. 788,467
[22] Filed Jan. 2, 1969
[45] Patented June 28, 1971
[73] Assignee Northwestern University, Evanston, Ill.

[54] ULTRASONIC IMAGE COLOR DISPLAY SYSTEM
10 Claims, 5 Drawing Figs.

[52] U.S. Cl. .................................................. 73/67.6,
 178/52R, 340/5MP
[51] Int. Cl. .................................................. G01m 9/24
[50] Field of Search ........................................... 73/67.5,
 67.6, 67.7, 67.8, 67.9; 340/5 (I), 3 (C); 178/6.8,
 5.2, 5.4

[56] References Cited
UNITED STATES PATENTS
2,508,358 5/1950 Ayres .......................... 340/3C
3,134,975 5/1964 Goodman ..................... 343/112.4
3,156,110 11/1964 Clynes ......................... 73/67.8

Primary Examiner—Robert L. Griffin
Assistant Examiner—Donald E. Stout
Attorney—Louis Bernat

ABSTRACT: An ultrasonic testing system includes a transmitting transducer for beaming sonic energy through a tank filled with a coupling medium to a receiving transducer. The received sonic energy is converted into an electrical signal which is then phase demodulated into three parts according to the phase of the received sonic energy. Each of these three parts is applied to a separate color related input terminal of a color TV receiver. Hence, the image on the picture tube is displayed in color according to the phase of the received signal.

PATENTED JUN28 1971
3,587,298
SHEET 1 OF 2
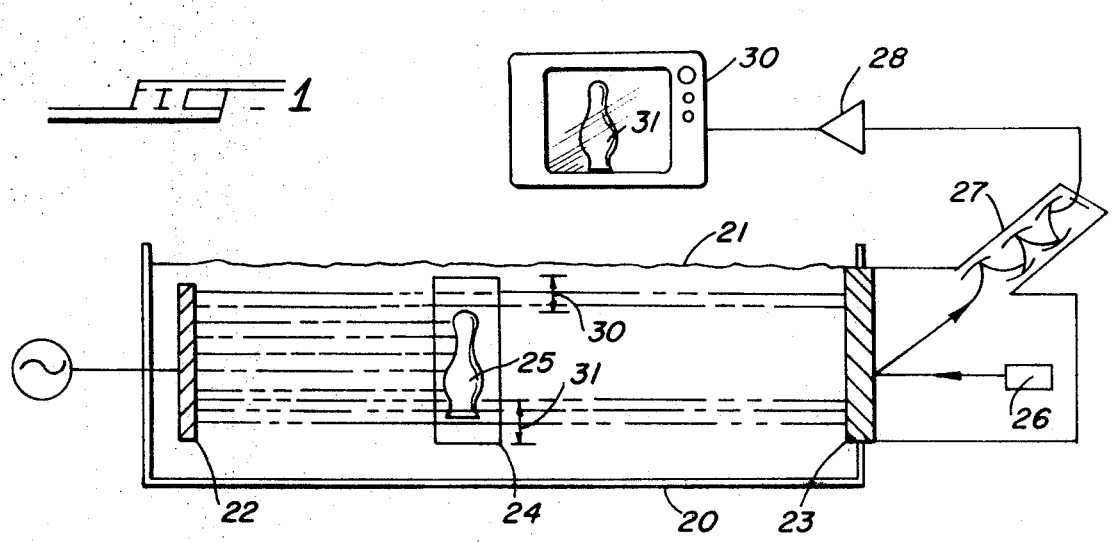
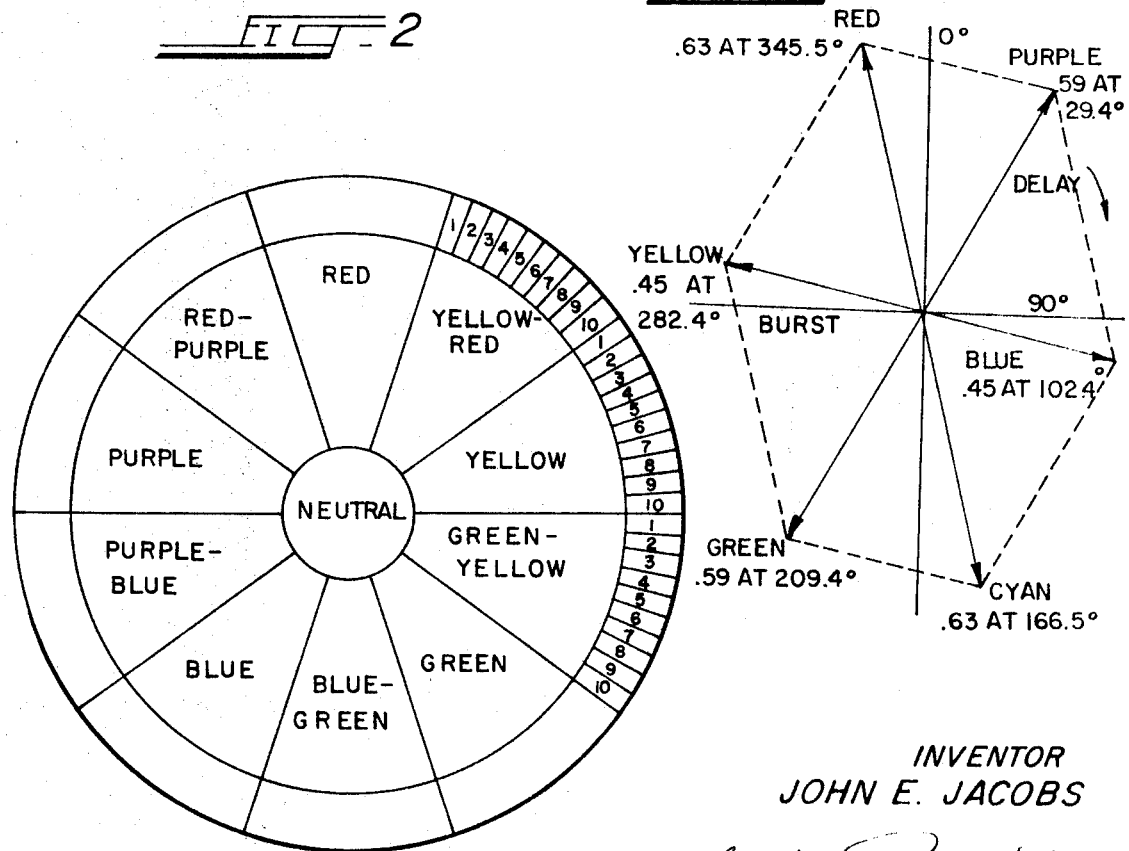
INVENTOR
JOHN E. JACOBS
BY Louis Bernat
ATTY

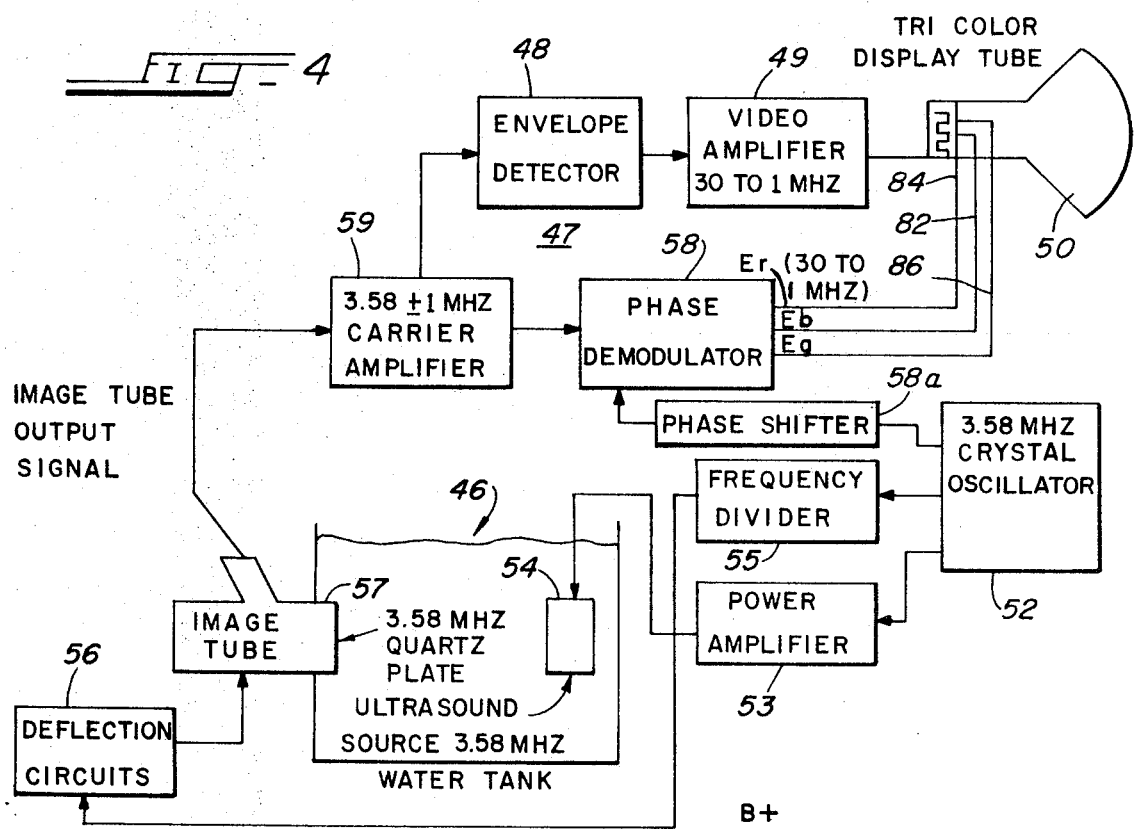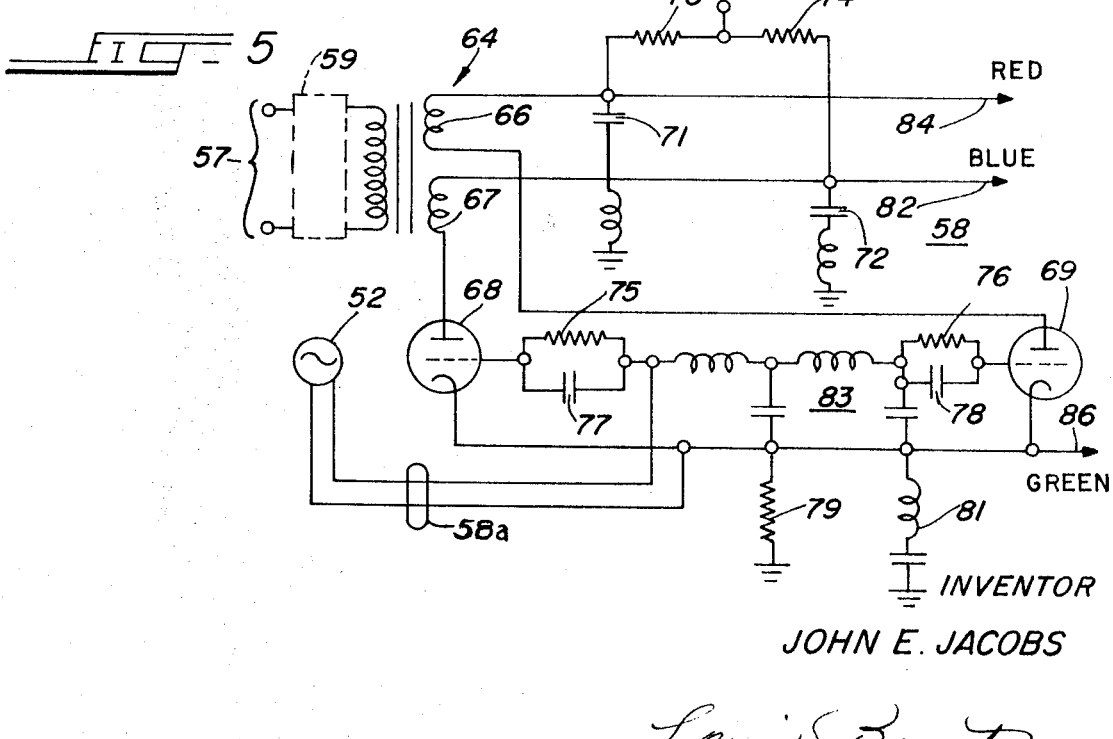

ULTRASONIC IMAGE COLOR DISPLAY SYSTEM

The invention described herein was made in the course of work under a grant or award from the Department of Health, Education, and Welfare.

This invention relates to ultrasonic image converters and display systems, and more particularly to novel systems for displaying such ultrasonic images in color.

In ultrasonic image converter systems of the described type, an object is placed in a tank filled with a coupling medium, such as water. Sonic energy is then beamed from one side of the tank through the coupling medium to the other side of the tank. The sound travels at different speeds through the coupling medium and any objects therein. Moreover, any discontinuities inside the object also influence the speed of sound. Hence, the incremental areas of the sonic energy pressure wave fronts reach a receiving transducer at the other side of the tank at slightly different time instances, depending upon the material through which the sonic energy passes. Therefore, the signal received by the receiving transducer includes an image of the material through which the sonic energy has passed. This image represents any and all factors influencing the propagational speed and transmitted intensity of the sonic energy.

The influencing factor to be examined may be selected by selecting a particular phase of the received signal which is then fed into the input of a television display receiver (which might be a home entertainment appliance). Thus, for example, if the object under test is a steel block having a void therein, the phase angle of the received signal may be selected to display an image of the void. This display is relatively simple since the difference between the steel and a void is stark and the contrast is easily observed.

The utility of ultrasonic image conversion systems could be expanded greatly if the contrast of the display is improved. For example, consider the use of an ultrasonic conversion system as an analytical tool for a medical examination of an organ or other part of the human body. If, say, a human hand is placed in the coupling medium, it affects the speed of sound in the medium, just as the steel block does. However, the effects produced by bone, tissue, blood, and the like, are closely similar. There are no gross and stark contrasts such as there are between steel and a void in the steel. Hence, if an analysis of hard—or something similar—is desired, the problem is to provide greater contrasts in the ultrasonic image displayed responsive to the received signals.

The foregoing speaks of the extremes of a stark contrast between steel and a void, and a very low contrast between blood and adjacent tissue. There are, of course, many other possibilities between these extremes. For example, a welded joint between two steel plates could also display a low contrast sonic image. Or, a metal having an area of fatigue would produce a low contrast image. The point is that there are many potential new uses for ultrasonic image display systems when the contrast is increased. Quite the contrary, even existing sonic image display systems may be improved when the contrast is improved.

Accordingly, an object of the invention is to provide new and improved ultrasonic image converter systems. More particularly, an object is to provide means for displaying sonic images with a greater contrast than was heretofore available. Here an object is to provide means for displaying sonic images of objects having very little differences in sonic propagation characteristics as compared with the sonic propagation characteristics of surrounding objects.

Another object is to provide a biomedical instrument for displaying images of organs and other internal parts of the body. Here, an object is to readily display images of such body parts with a great contrast, as compared with adjacent internal body parts.

In keeping with an aspect of the invention, these and other objects are accomplished by providing a phase demodulation means for separating, into three parts, the electronic signals derived from sonic energy passing through an object under test. Each of these three separated signals is applied to a corresponding color related input terminal of a color television receiver. Hence, each of the separated signals produces a color image which is different from the color of an image cast by an adjacent part. The color of any particular part is not necessarily too relevant; it is the contrast which is important. Nevertheless, there are known sonic related color effects which may be adopted to give a more realistic color display.

The nature of a preferred embodiment of the invention will become more apparent from a study of the following description when taken in connection with the attached drawings, in which:

FIG. 1 is a schematic diagram showing a conventional ultrasonic image display system;

FIG. 2 shows one form of the well-known Munsell control circles which illustrates how the human eye reacts to color as a function of apparent brightness;

FIG. 3 is a vector diagram showing how ultrasonic carrier amplitudes and phase shifts produce different colors;

FIG. 4 is a block diagram which shows how a system may be made to display ultrasonic images in color in order to produce greater contrast; and FIG. 5 is a schematic circuit diagram which shows how a sonic signal may be demodulated into three color related signals.

A conventional ultrasonic image display system is shown in FIG. 1. The tank 20 is filled to a surface level 21 with a coupling medium (such as water). A piezoelectric transmitting transducer 22 beams sonic energy from one side of the tank 20 through the coupling medium to a receiving transducer 23 at the other side of the tank. If an object 24, such as steel, is placed in the coupling medium, the sonic energy passing through the object 24 experiences a speed increase or reduction, depending upon the physical characteristics of the object. If there is a discontinuity 25 inside the object 24, the sonic energy experiences still other sonic speed and intensity changes. Hence, the sound waves reaching the surface of the receiving transducer 23 are accelerated or decelerated by various amounts depending upon the characteristics of the material through which the sound passes.

For example, if the velocity of sound is higher in the object 24 than in the coupling medium, the sonic pressure wave front in the shadow 30, 31 of the object arrives at the receiving transducer 23 in advance of the sonic pressure wave passing through only the medium, per se. On the other hand, sound travels much slower in a void. Thus, the sonic pressure wave front in the shadow of the void 25 arrives at the receiving transducer 23 later than the same sonic pressure wave front not passing through the void. Hence, the sonic pressure wave experiences a phase change responsive to the nature of the material through which the sonic energy passes.

If the receiving transducer 23 is a piezoelectric plate or mosaic, piezoelectric potentials appear on the back of the plate in accordance with the mechanical excursions which it experiences responsive to the received sonic energy. An electron gun 26 may then scan the back of the piezoelectric plate 23. The energy in the cathode ray releases secondary electrons as a function of the piezoelectric potentials appearing on the surface. These electrons are collected by an electron multiplier 27 of known design. Thus, an electrical signal appearing at the output of the electron multiplier is amplitude and phase modulated in accordance with the piezoelectric signal resulting from the sonic energy.

The output electrode of the electron multiplier 27 is connected through a conventional amplifier 28 to the input of a conventional television receiver 30. The receiver responds to the multiplier output signal by displaying an image 31 of the discontinuity 25, if the phase of the sonic energy influenced most by the void is selected from the multiplier output. Obviously, many complexities may be added to the system of FIG. 1 in order to improve the display, but the general principles have remained the same.

In this conventional ultrasonic image converter system (FIG. 1), the image on the television receiver is one of several shades of gray. The human eye can recognize as many as 10 shades of gray under ideal conditions. However, the usual black and white television receiver cannot reliably present more than five shades of gray which may be differentiated by the human eye.

On the other hand, the human eye is quite sensitive to differences in color. In fact, without lenses, a color television display of a sonic image enables the eye to detect signals resulting from as little as one part in $10^8$ changes in the acoustic impedances which produce the image. With lenses, the resolution can be further improved, For example, FIG. 2 is one of the well-known Munsell color hue circles showing the various tints and colors which may be detected by the human eye. The point of the circle is that the human eye can recognize approximately 10 steps of brightness for any given color. However, if it is assumed that the eye can also recognize 10 separate colors, with 10 recognition steps for each color, there are 100 separate steps which the eye can recognize—as compared with only 10 steps when only one color, gray, is used. Moreover, the particular color hue circle of FIG. 2 is only one of many which could be drawn. For example, the same color mixture presents an appearance of yellow at one level of brightness and brown at another level of brightness. The eye can readily detect the difference between yellow and brown. Thus, one color mixture may now be recognized in 20— —not 10— —steps. The conclusion to be drawn is that a conversion of a sonic image into color greatly increases the sensitivity of the human eye with respect to the sensitivity of the eye to the same image in shades of gray on a black and white TV set. Thus, the contrast of an image may be enhanced.

A study has been made to discover the color displayed on a color television set, relative to the phase angle change in an ultrasonic image signal fed into the set. FIG. 3 is a vector diagram which shows the effects which were found to occur responsive to the indicated phase shifts in the ultrasonic pressure front. Thus, for example, a phase shift of 29.4° produces a purple color; a phase shift of 102.4° produces a blue color, etc.

In keeping with an aspect of the invention, a system may be constructed as disclosed in FIG. 4 in order to convert a sonic image into a color picture. Here, an ultrasonic testing system 46 is coupled to a color television receiver 47, which may be a conventional home entertainment appliance. This receiver will have the usual envelope detector 48 for detecting the video signal. The output from the detector is applied through an amplifier 49 to drive the receiver and produce a picture on the face of the tube 50.

The entire system is driven from and synchronized by a common oscillator 52—preferably of a conventional crystal controlled design. The oscillator should operate at about 3.58 mHz. when the color TV 51 is constructed according to the NTSC standards which are commonly used in the United States. This 3.58 mHz. color lies in the yellow-green range which appears brightest to the human eye. However, this particular frequency is not critical; the system may be designed to operate at almost any convenient and appropriate frequency.

In greater detail, three outputs from the oscillator 52 are used to synchronize the system. One output drives a power amplifier 53 and the transmitting transducer 54 which beams sonic energy through the coupling medium. Another output from the oscillator 52 is applied through a frequency divider 55 to a deflection circuit 56 for synchronizing the transmitting and receiving transducers 54, 57. Yet another output from the oscillator 52 is applied through phase shifter 58a to synchronize a phase demodulator 58 which develops three color related signals for coloring the TV picture produced responsive to the envelope detected at 48.

As those who are skilled in the art know, the standard color television system (NTSC) transmits three color related signals commonly called the "Y," "I," and "Q" signals, which are fed through a demodulator having an output matrix. The matrix output signals are red-yellow (R-Y), green-yellow (G-Y), and blue-yellow (B-Y). The yellow (Y) signal is applied to the cathode of the picture tube, and the "R-Y," "G-Y," and "B-Y" signals are fed onto three grids in the picture tube. The yellow signal on the cathode adds to each of the grid signals to cancel the "Y" component, thus leaving the red, blue, and green signals. The yellow signal on the cathode then functions as a brightness signal.

The inventive ultrasonic system uses the three transmitted signals in a different manner. In this instance, the "Y" signal is not generally used. The "R-Y," "G-Y" and "B-Y" signals are used. By adjusting the phase shifter circuit 58a, any one of the three colors may be applied to any part of the television picture of the ultrasonic image. Thus, for example, if the object under test is a weld, which is supposed to be of uniform thickness, the phase shifter 58a is adjusted until that uniform thickness is a selected color, such as green. If the entire weld is in fact of uniform thickness, the entire weld will appear to be green in the television picture of the weld image. On the other hand, if the weld changes thickness, some other color will appear in the television picture.

It is noted that if the weld were to increase or decrease in thickness by exactly one wave length, the color would continue to appear green. HOwever, it is difficult for such a quantitative jump to occur in such uniformity. Almost certainly there will be a change in some other degree so that another color will appear in the picture of the image. In a strict sense, one wave length (360°) is equal to $2.5 \times 10^7$ impedance steps.

The manner in which this color selection occurs will become more apparent from a study of FIG. 5. In greater detail, while the phase demodulator 58 may take any of several suitable forms, a preferred embodiment of the invention uses the phase demodulator shown in FIG. 5. The input signal is derived from a source 57 (which may be the receiving transducer 57). The signal is applied to the primary winding of a transformer 64 via a dot-dashed rectangle 59.

Two output windings 66, 67 on the transformer 64 are arranged to apply two color related signals R-Y and B-Y) to the anode circuits of two triodes 68, 69. Each output winding has a filter 71, 72 connected thereto. These filters are tuned to pass the carrier or output of oscillator 52(3.58 mHz., in this case) to ground. Thus, the carrier frequency does not appear in the load currents of the triodes 68, 69.

The anode circuits of the triodes 68, 69 include the secondary windings 67, 68 and load resistors 74, 73, respectively. The grid circuits of the triodes 68, 69 include grid leak resistors 75, 76 and coupling capacitors 77, 78, respectively. The coupling is for the carrier frequency (here 3.58 mHz.). The cathodes are biased via a common resistor 79 which also functions as a cathode load. A filter 81, also tuned to the carrier or output frequency of oscillator 52, conducts the carrier to ground and removes it from the cathode bias potential (i.e., the voltage at the ungrounded end of the resistor 79).

The carrier or output of the oscillator 52 is also applied between the grid and cathode of the triodes 68, 69 to provide a reference voltage synchronized with the input signal at 57. Thus, the triode 68 is biased to turn on or come on harder at the instant when its plate load reflects the input signal induced in secondary winding 67 of the transformer 64.

The circuit 83 is a phase shift circuit comprised of inductive and capacitive elements. In conventional color NTSC television systems, the phase shift is preferably of the order of 63° to 64°. Thus, the triode 69 is driven on and off by the oscillator 52 and the carrier frequency, but a phase shift of 63° to 64° with respect to the one and off cycle of the triode 68.

The demodulation circuit 58 operates this way. As the oscillator output rises and falls, the triodes turn on and off at a phased delay relationship with respect to each other. When the triode 68, for example, turns on, it draws current over a path traced from ground through the cathode load resistor 79, the cathode to anode path in triode 68, winding 67, and anode load resistor 74 to B+ battery. Slightly later (a phase angle 63.58°, for example), the triode 69 turns on and draws current over the path traced from ground through the cathode load resistor 79, the cathode to anode path in triode 69, winding 66, and anode load resistor 73 to B+ battery. As current flows in these triode circuits, the ultrasonic image signal is induced across the transformer 64 to add to or subtract from the triode current in the windings 66, 67.

Hence, the current through the three load resistors 73, 74, 79 reflect the input signals at 57. The voltage at output terminal 82 represents the input signal during one half-cycle in each cycle of the oscillator 52 output. The voltage at the output terminal 84 represents the input signal during 1 half-cycle, delayed by a 63.58° phase angle, as compared to the output at terminal 82. The output terminal 86 receives a signal which is a summation of the signals at the terminals 84, 82. That is, when the triode 68 is conducting alone, all of the current through the cathode load resistor 79 also flows through winding 67 and resistor 74. At a later time (63.58° phase angle delay), the current through resistor 79 divides between the two loads 67, 74 and 66, 73. Still later, the carrier from oscillator 52 reaches the half-cycle which turns off the triode 68, and all of the current through resistor 79 flows through the load 66, 73.

The foregoing describes the triodes 68, 69 as turning on and off. However, this description is merely to facilitate an understanding of the invention. Obviously, the bias potentials may be selected to operate the triodes in any suitable manner.

The output terminals 82, 84, 86 are connected to the blue, red, and green grids in the color picture tube 50 (FIG. 4). Hence, each color phosphor of the tube is activated responsive to a slightly different phase in the sonic energy striking the face of the receiving transducer 57.

Moreover, by making the phase shift circuit 83 adjustable the output signals at the terminals 82, 84 may be made responsive to different phases in the sonic energy. Thus, for example, assume that the ultrasonic energy in a particular system passes through two elements. Assume further that the speed of sound through the two elements produces, say, a 70° phase shift relative to each other. If the phase shift circuit 83 is adjusted to have a 70° phase shift, one of the elements can be made to appear red and the other blue when the image id displayed on the face of the picture tube 50. If it had been assumed that the pertinent phase angle shift at the face of the receiving transducer 57 were, say, 50°, the phase shift circuit 83 may also be adjusted to 50°. Again, one signal appears red and the the blue when the sonic energy is displayed.

Those who are skilled in the art will readily perceive how any one of the three colors may be adjusted to correspond to a particular one of the phase angles in the sonic energy image. For example, if it should be necessary or desirable for, say, blood to cast a red image, the phase of the carrier wave may be shifted at 58a until the signal responsive to the pressure wave front of the sonic energy passing through blood coincides with a red signal at output terminal.

Thus, the appended claims are to be construed broadly enough to cover all equivalents reasonably falling within the true spirit of the invention.

I claim:

1. An ultrasonic image converter system for giving a color display comprising a source of an electrical signal wave form having a predetermined single frequency, an ultrasonic testing system, means comprising a coupling liquid having associated ultrasonic transmitting and receiving transducers, said transducer being driven responsive to said wave form for transmitting ultrasonic energy from said transmitting transducer through said coupling liquid for generating an ultrasonic image at said receiving transducer, means synchronized by said single frequency wave form for generating electrical signals responsive to said ultrasonic image, means responsive jointly to said electrical signals and said single frequency wave form for developing three signals having color related phase relationships representing said sonic image, and means for shifting the phase relationship of said three signals to correspond to the phases in said ultrasonic image for displaying selected phases in said ultrasonic image as distinctive colors on a color television picture tube.

2. The color display system of claim 1 and phase shift means associated with said jointly responsive means and said source for introducing a phase delay in said wave form to cause a particular phase in said ultrasonic image to be related to a particular color in said television picture.

3. An image converter color display system comprising oscillator means for producing a predetermined single frequency electrical signal, ultrasonic transmitter means operated responsive to said predetermined oscillator frequency, said transmitter being coupled to transmit ultrasonic energy into a liquid medium, receiving transducer means coupled to said liquid medium, said receiving transducer detecting the phase differences in the ultrasonic energy transmitted through said coupling liquid, said phase differences being caused by an object immersed in said coupling liquid, means responsive to the signal detected by said receiving transducer and the signal produced by said oscillator for producing color encoded signals according to the phase differences detected in said ultrasonic signal by said receiving transducer, adjustable phase shifting means coupled between said oscillator and said color encoding means for varying the color encoded information, and means for displaying said color encoded information on a color television display tube.

4. The system of claim 3 and means responsive to each phase of said electrical signal for displaying a corresponding color in an image on a color picture tube.

5. The system of claim 4 wherein said electrical signal developing means comprises a pair of electronic devices driven responsive to the output of said oscillator, adjustable means for phase shifting the response of one of said devices with respect to the response of the other of said devices, and a pair of means individually responsive to the output of said devices for generating two of the electrical signals, whereby a first of said devices responds to one phase in the ultrasonic image and a second of said devices responds to another phase displaced from said one phase by the angle of phase shift selected by said adjustable means.

6. The system of claim 5 and means jointly responsive to said two devices for developing the third of the electrical signals.

7. The system of claim 6 wherein each of said devices comprises an electronic means having three electrodes, said pair of individually responsive means comprising two load resistors connected to individually corresponding ones of the electrodes on said two devices, said means jointly responsive to said two devices comprising a single load resistor connected to a second corresponding electrode on each of said two devices.

8. The system of claim 7 and means for connecting said oscillator directly to the third electrode on one of said devices and through an adjustable phase shift circuit to the third electrode on the other of said devices.

9. A biomedical instrument for displaying images of organs and other internal parts of the human body immersed in a coupling liquid, said instrument comprising means for transmitting ultrasonic energy through said liquid and organ, means responsive to said transmitted energy for developing an ultrasonic image of such part, means for displaying said ultrasonic image on a color television receiver, means for shifting the phase of color signals driving said receiver to correspond to the phases of said ultrasonic energy image, and single frequency oscillator means for controlling said transmitting means, said signal responsive means and phase shifting means.

10. A color solenoid image display system comprising an oscillator, which produces a single frequency signal, coupled through a phase shifter circuit means to a phase demodulator circuit, means coupled to said demodulator and operated responsive to said oscillator for generating a sonic image signal said phase shifter means shifting the output phase of said oscillator signal applied to said demodulator circuit with respect to the output phase of said oscillator applied to said sonic image signal generating means whereby any selected color may be assigned to any selected aspect of said image, and means responsive to said signals from said phase demodulator for displaying said image on a color television receiver.